United States Patent [19]

Alberto

[11] 4,350,747

[45] Sep. 21, 1982

[54] ELECTROCHEMICAL CELL WITH EXTERNALLY COATED HERMETIC SEALS

[75] Inventor: Vicente S. D. Alberto, Parma, Ohio

[73] Assignee: Union Carbide Corporation, Danbury, Conn.

[21] Appl. No.: 248,217

[22] Filed: Jun. 16, 1981

[51] Int. Cl.³ .............................................. H01M 2/08
[52] U.S. Cl. ..................................... 429/184; 429/174
[58] Field of Search ...................... 429/181, 184, 174

[56] References Cited

U.S. PATENT DOCUMENTS

| | | | |
|---|---|---|---|
| 4,076,908 | 2/1978 | Böcher et al. | 429/184 |
| 4,115,629 | 9/1978 | Dey et al. | 429/56 |
| 4,127,702 | 11/1978 | Catanzarite | 429/56 |
| 4,168,351 | 9/1979 | Taylor | 429/48 |
| 4,212,930 | 7/1980 | Athearn | 429/181 X |

Primary Examiner—Charles F. LeFevour
Attorney, Agent, or Firm—Cornelius F. O'Brien

[57] ABSTRACT

An electrochemical cell system assembled in a closed housing in which said housing has a protruding terminal electronically insulated from and hermetically sealed to said housing using a layer of insulating material (e.g., glass or ceramic) and wherein the exposed external interfacial areas of the insulating material/terminal and the insulating material/cell housing, and preferably also the exposed external area of the insulating material, are coated with a layer of nonconductive, water-resistant, protective material (e.g., wax or asphalt) so as to prevent seal corrosion and electrolyte leakage from the cell when it is exposed to a high humidity environment.

10 Claims, 3 Drawing Figures

ELECTROCHEMICAL CELL WITH EXTERNALLY COATED HERMETIC SEALS

FIELD OF THE INVENTION

The invention relates to a hermetic seal for electrochemical cells, such as nonaqueous cells, employing a terminal member electronically insulated from and hermetically sealed to the cell's housing by a layer of an insulating material and wherein the exposed exterior interfacial joint areas, and preferably also the exposed exterior area of the insulating material, are coated with a nonconductive material such as a halocarbon wax or asphalt so as to prevent corrosion of the seal.

BACKGROUND OF THE INVENTION

Some cell systems, such as the lithium/oxyhalide cell system or the lithium/$MnO_2$ cell system, preferably utilize a hermetically sealed housing. Specifically, cell systems employing lithium, high vapor pressure organic solvents and inorganic cathode/solvent materials are required to be hermetically sealed in order to prevent the exposure of the highly reactive and corrosive cell materials to the outside environment and to provide superior shelf life. Consequently, venting-type hermetic seals have been employed in the battery art and in applicant's copending application Ser. No. 248,215 a hermetic seal is disclosed for electrochemical cells, such as nonaqueous cells, comprising a flexible metallic cover sealed to the open end of a container housing the cell components and said flexible cover having a radially inwardly disposed flange defining an opening through which a conductive terminal of the cell passes. The terminal is hermetically sealed to the cover by a layer of glass or ceramic material bonded to both the flange and the terminal. The flexible cover is formed such that a predetermined pressure buildup within the cell will cause the cover to flex sufficiently so as to fracture the glass or ceramic material or the bond between the cover and the glass or ceramic, or between the terminal and the glass or ceramic, thereby forming a vent passage from the cell. The disclosure made in this application is incorporated herein by reference.

U.S. Pat. No. 4,115,629 discloses a cell closure which includes a flexible metal member which has an aperture of predetermined area over which a non-polarized metallic disc of a size larger than the aperture is symmetrically positioned and a glass or ceramic layer is then hermetically bonded to the closure and to the disc. The wall structure of the bond is formed so that a predetermined gas buildup within the cell will cause the wall to rupture thereby venting the gas from the cell.

U.S. Pat. No. 4,127,702 discloses a self-venting battery wherein an insulating material such as glass or ceramic is provided between and bonded to the terminals for electrically insulating them from one another and wherein the insulator is such that increasing pressure within the battery will cause the insulator to crack a sufficient amount to vent the pressure in the battery before causing the bond between the insulator and terminals to fail.

Although venting-type hermetic seals employing glass or ceramic materials have been used with some success, they are sometimes subjected to degradation or corrosion when exposed to certain environments. In U.S. Pat. No. 4,168,351 a means is disclosed for preventing deterioration of a glass-to-metal seal in a lithium cell which consists of protecting the exposed interior of the glass with a metal oxide or a nonconductive, nonreactive polymeric material such as a fluorocarbon or a polyolefin stable in the presence of lithium and other cell components.

It is an object of the present invention to provide a hermetic seal for electrochemical cells that can withstand high humidity environments without deteriorating or succumbing to corrosion, the corrosion products in some cases being electrically conductive and possibly resulting in wasteful discharge of the cell.

It is another object of the present invention to provide a hermetic seal that is coated on the exterior with an adherent, nonconductive, water-resistant, protective material so as to prevent corrosion in the seal which could result in electrolyte leakage.

It is another object of the present invention to provide an effective corrosion-free hermetic seal for lithium cells.

It is another object of the present invention to provide a method for effectively preventing hermetic seal corrosion in electrochemical cells such as lithium electrochemical cells.

SUMMARY OF THE INVENTION

The invention relates to an electrochemical cell system in a closed housing comprising a container having an open end closed by a cover and having a terminal member which can be electronically connected to one electrode member of the cell system, said terminal member being electronically insulated from and hermetically sealed to said housing by a layer of an insulating material, the improvement wherein the exposed exterior interfacial areas, and preferably also the exposed exterior area of the insulating material, are coated with an adherent, nonconductive, water-resistant, protective polymeric material such as asphalt, waxes, and fluorocarbon polymers.

The invention also relates to a method for effectively preventing corrosion of a hermetic seal in an electrochemical cell comprising the steps:

(a) assembling an electrochemical cell system in a container and closing said container with a cover to provide a closed housing and said closed housing having a terminal member electronically insulated from and hermetically sealed to said housing by a layer of insulating material;

(b) cleaning the exposed external interfacial areas of said insulating material/terminal and insulating material/housing, and preferably also the exposed exterior area of said insulating material; and (c) depositing a layer of an adherent, nonconductive, water-resistant, protective material onto the cleaned exposed external interfacial areas of said insulating material/terminal and insulating material/housing, and preferably also onto the exposed external areas of the insulating material, so as to effectively prevent corrosion of the hermetic seal when exposed to high humidity environments.

Hermetic seals, such as glass-to-metal seals, when employed in cells utilizing, for example, lithium have sometimes exhibited corrosion and, eventually, electrolyte leakage between the insulating glass member and the external metal parts of the cell when exposed to a high humidity environment. It was also observed that the rate of corrosion and electrolyte leakage increased with storage temperature. This corrosion at the glass-tometal interface in a high humidity environment possibly could be attributed to the following factors:

(a) The metal parts of the cell could be contaminated with the cell's electrolyte and/or other active components of the cell during assembly. Since most corrosion processes occur mainly in an aqueous environment, then corrosion could result from electrochemical reactions in which water acts as the electrolyte. The number of ions in pure water is very small making it a very poor conductor. Hence, aqueous corrosion is also very limited. On the other hand, if an ion-producing substance such as $SOCl_2$ is added to water, the conductivity of the resultant electrolyte will increase. Under this condition, aqueous corrosion of the metal will proceed at a faster rate. This situation is further aggravated by the potential of a live cell, specifically high voltage electrochemical systems such as certain lithium cells. If the positive and negative terminals of a cell are joined by an electrolyte bridge, electrolysis of water will occur. The oxygen from the decomposed $H_2O$ molecules will oxidize the positive terminal of the cell. If this process is allowed to continue, the corrosive electrolyte contained within the cell will eventually leak out due to metal failure as a result of corrosion. This problem is of particular concern in cells having a terminal voltage of 3 volts or more such as lithium/thionyl or sulfuryl chloride cells and lithium/$MnO_2$ cells because the terminal voltage is sufficient to cause electrolysis of water. The problem of electrolysis of water may also exist in lower voltage electrochemical systems such as alkaline-$MnO_2$ and carbon-zinc. The magnitude of the problem, however, may be less than with higher voltage systems. However, the proposed invention of preventing seal corrosion and electrolyte leakage should also enhance the long-term shelf reliability of the lower voltage electrochemical systems.

(b) Differential aeration corrosion could occur when oxygen (air) is not uniformly distributed over the surface of a metal. For instance, a drop of water on the surface of the metal will give rise to a phenomenon in which the region around the drop is cathodic because it is in contact with well-oxygenated air. On the other hand, the area at the center of the drop is anodic because of the lack of exposure to oxygen. This being the case, the area at the center of the drop of water will corrode preferentially. This type of corrosion can very well occur at the glass-metal interface in glass-to-metal seals because of "pockets" which are occasionally formed as a result of imperfect glass meniscus. Moisture may lodge in these pockets and give rise to this differential aeration corrosion.

(c) The formation of a strong bond between glass and metal is due, in general, to the presence of an oxide layer that is formed on the metal surface just before the seal is made. This oxide layer might be susceptible to corrosion attack or the reaction of molten glass with the metal may produce a certain compound that is vulnerable to corrosion. The bond mechanism in the formation of a glass-to-metal seal is not only physical but also chemical in nature and, therefore, subject to corrosion at the glass-to-metal interfaces.

Accordingly, the present invention involves (a) cleaning the glass-to-metal seal to eliminate contamination by electrolyte and/or other cell components which could occur during cell assembly, and (b) coating the glass-to-metal seal with impervious materials to separate the seal from the external corrosive environment.

The cleaning step involves washing the cell (especially the seal area) with copious quantities of a cleaning fluid, for example, water, followed by drying. The coating step involves the application of a nonconductive coating to the dry glass-to-metal seal. The coating should remain substantially continuous and adherent and resistant to environmental and mechanical abuse conditions because partial breakdown of the coating may lead to increased corrosion due to intense localized corrosion.

Examples of suitable coating materials include polymeric materials such as asphalts, waxes, polypropylene and polyethylene, and fluorocarbon materials such as FEP copolymers marketed by E. I. DuPont de Nemours & Company under the trade name "Teflon". The protective material could be applied to the surface of the glass-to-metal seal by spraying, brushing, dispensing, dipping, electrodeposition or the like.

Suitable insulating materials for the hermetic seal could be glass materials such as those which include borosilicate glasses (i.e., type 203 KN obtained from Glass Bead, Inc.) or ceramic materials such as those containing alumina as a major ingredient. The cell housing could be made of stainless steel or cold-rolled steel.

Figure 1:
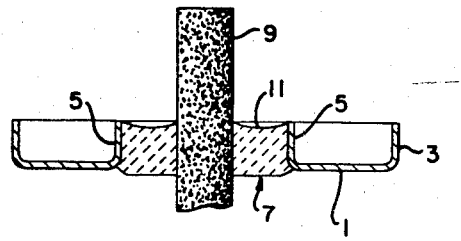
FIG. 1 is a sectional elevation taken through a cover seal assembly for use in this invention.

Referring in detail to FIG. 1, there is shown a U-shaped cover 1 having an upwardly disposed peripheral skirt 3 and an inner upwardly disposed flange 5. The inner disposed flange 5 defines an opening 7 through which a centrally disposed electrode terminal 9 protrudes and is sealed to said flange 5 using a layer 11 of glass or ceramic bonded to both flange 5 and terminal 9. Skirt 3 is suitably adapted for being secured to the upper rim of a conventional cell can or container.

Figure 2:
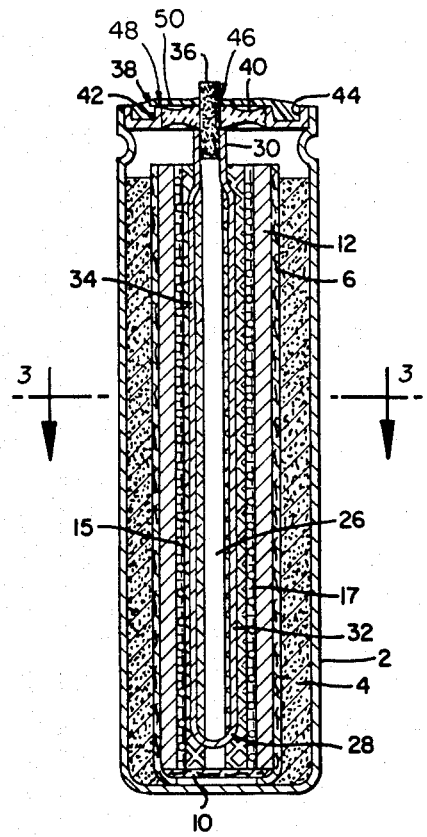
FIG. 2 is a sectional elevation taken through a fully assembled electrochemical cell employing a hermetic seal coated with an adhesive, nonconductive, water-resistant, protective polymeric material in accordance with this invention.

Referring in detail to FIG. 2, there is shown a cross-sectional view of a cylindrical cell comprising a cylindrical container 2 having disposed therein a cathode collector shell 4 in contact with the inner upstanding circumference of the container 2 thereby adapting the container as the cathodic or positive terminal for the cell. Disposed within and in contact with the inner circumference of cathode collector 4 is a separator liner 6 with its bottom separator or disc 10. If desired, the cathode collector material could be extruded within the container 2, rolled with the can material or composed of one or more segments to form a cylindrical tube and then placed in the can.

Figure 3:
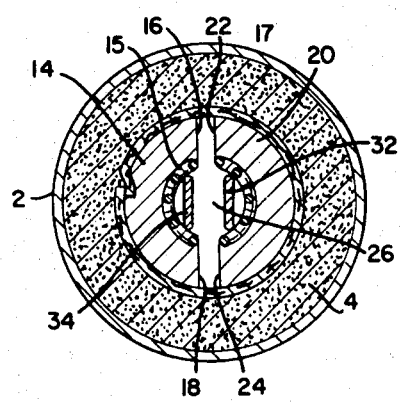
FIG. 3 is an enlarged horizontal cross-sectional view taken along line 3—3 of FIG. 3.

A two member anode 12 is shown in FIGS. 2 and 3 comprising a first half cylindrical annular member 14 having flat end faces 16 and 18 and a second half cylindrical annular member 20 having flat end faces 22 and 24. When the flat end faces of each half cylindrical member are arranged in an opposing fashion as shown in FIGS. 2 and 3, an axial opening 26 is defined between the half cylindrical annular members 14 and 20.

If desired, arcuate type backing sheets 15 and 17, such as inert electrically conductive metal screens or grids, could be disposed against the inner surface wall of the anode bodies 14 and 20, respectively, to provide uniform current distribution over the anode. This will result in a substantially uniform consumption or utilization of the anode while also providing a substantially uniform spring pressure over the inner wall surface of the anode as will be discussed below.

An electrically conductive spring strip 28 is appropriately bent into a flattened elliptically shaped member having extending ends 30. When inserting the spring strip 28 into a container, the legs 32, 34 of the conductive strip 28 are squeezed together and forced into the axial opening between the two screen backed anode members arranged in a container as shown in FIGS. 2 and 3. The inserted conductive spring strip 28 resiliently biases the two anode members 14 and 20 via backing screens 15 and 17 so as to provide a substantially uniform and continuous pressure contact over the inner wall of the anode members. The extended ends 30 of spring strip 28 are shown projected above the surface of anode members 14 and 20 and containing a cylindrical terminal 36. Terminal 36 is shown protruding through flexible cover 38 and hermetically sealed to cover 38 using a layer of glass 40 bonded to said terminal 36 and the flange 42 of cover 38 as basically shown in FIG. 1. The skirt 44 of cover 38 is welded to container 2 thereby adapting the container as a terminal of the cell while terminal 36 is adapted as the other terminal of the cell. Before closing the cell with the cover, the cathode-electrolyte comprising a suitable salt dissolved in an oxyhalide, a halide with a cosolvent, or mixtures thereof can be dispensed into the cell whereupon it can permeate through the anode, separator and cathode collector.

As shown in FIG. 2, the exposed exterior interfacial area 46 of insulating material 40 and terminal 36 and the exposed exterior interfacial area 48 of insulating material 40 and the cover 38 of the cell housing are coated with an adherent, nonconductive, water-resistant, protective polymeric material 50. This coating will substantially prevent corrosion at the exposed exterior insulation-terminal interface area 46 and the exposed exterior insulation-cover interface area 48 of the cell as discussed above.

EXAMPLE I

Several 0.475 inch diameter cells were produced employing a lithium anode and a cathode-electrolyte of 1.5 M LiAlCl$_4$ in thionyl chloride. The active components of each cell were placed in a cylindrical container and the container was then closed at the top with a cover. The cover had a centrally disposed opening through which a polarized terminal of the cell projected and in which said polarized terminal was electronically insulated from and hermetically sealed to the cover using a layer of glass. The exposed external glass area and joint areas of the glass-to-metal seals on each of five cells were coated with 0.2 gram of a halocarbon wax which was applied by melting the wax and dispensing it over the selected interfacial seal areas and also over the complete exposed glass insulator. The wax was obtained from Halocarbon Products, a division of Fluor-Chem Corporation, Hackensack, N.J. under the trade name Halocarbon Wax No. 15-00. (This material is a solid, saturated, hydrogen-free chlorofluorocarbon having a boiling point above 500° F. and a melting point of 270° F.) The exposed external seal areas on ten additional cells were cleaned by washing with copious quantities of water, followed by complete drying. On each of five cleaned cells, the selected exposed external seal areas were coated with 0.2 gram of the halocarbon wax as described above. The three lots of five cells each described above, along with five cells which were not cleaned or given a wax coating, were stored at 100% humidity at 71° C. The cells in each lot were inspected for seal corrosion (SC) and seal leakage (SL). The data observed as to when corrosion and leakage occurred are shown in Table 1.

TABLE 1

| 5 Cells In Each Lot | No Wax Coating | Wax Coating |
|---|---|---|
| As Produced (not cleaned) | S.C. - 1 day | S.C. - days |
|  | S.L. - 7 days | S.L. - 10 days |
| Cleaned | S.C. - 21 days | S.C. - *none |
|  | S.L. - *none | S.L. - *none |

*in excess of 21 days.

As evident from the data shown in Table 1, the cells produced in accordance with this invention did not show any corrosion and leakage even after being stored for 21 days at 100% humidity at 71° C.

EXAMPLE II

Several 0.475 inch diameter cells were produced as in Example I except the coating applied to certain of the cells at the selected external areas was a high temperature asphalt material obtained from Witco Chemical Company as Pioneer Asphalt. The cells were stored at 100% humidity at 71° C. and were inspected for seal corrosion (SC) and seal leakage (SL). The data observed as to when corrosion and leakage occurred are shown in Table 2.

TABLE 2

| 5 Cells in Each Lot | No Asphalt Coating | Asphalt Coating |
|---|---|---|
| As Produced (not cleaned) | S.C. - 1 day | — |
|  | S.L. - 7 days | — |
| Cleaned | S.C. - 21 days | S.C. - *none |
|  | S.L. - *none | S.L. - *none |

*in excess of 30 days.

As evident from the data shown in Table 2, the cells produced in accordance with this invention did not show any corrosion and leakage even after being stored for 30 days at 100% humidity at 71° C.

Modifications may be made in the construction details and in the arrangements of the related components without departing from the spirit of the invention as set forth in the appended claims.

What is claimed is:

1. An electrochemical cell system assembled in a closed housing comprising a container having an open end closed by a cover and having a terminal member electronically insulated from and hermetically sealed to said housing by a layer of an insulating material, the improvement wherein the exposed exterior interfacial areas of the insulating material and terminal and the insulating material and housing are coated with an adherent, nonconductive, water-resistant, protective polymeric material.

2. The electrochemical cell of claim 1 wherein the external exposed area of the insulating material is coated with the polymeric material.

3. The electrochemical cell of claim 1 or 2 wherein the layer of insulating material is selected from the group consisting of glass and ceramic.

4. The electrochemical cell of claim 3 wherein the coating of the nonconductive, water-resistant, protective material is a halocarbon wax.

5. The electrochemical cell of claim 3 wherein the coating of the nonconductive, water-resistant, protective material is asphalt.

6. The electrochemical cell of claim 1 or 2 wherein the coating of the nonconductive, water-resistant, protective material is a fluorocarbon polymer.

7. The electrochemical cell of claim 1 or 2 wherein the cover has an opening through which the terminal member passes, said terminal member being a conductive member electronically connected to an electrode member of the cell system and being electronically insulated from and hermetically sealed to said cover by a layer of glass or ceramic.

8. The electrochemical cell of claim 7 wherein the coating of the nonconductive, water-resistant, protective material is a halocarbon wax.

9. The electrochemical cell of claim 7 wherein the coating of the nonconductive, water-resistant, protective material is asphalt.

10. The electrochemical cell of claim 7 wherein the coating of the nonconductive, water-resistant, protective is a fluorocarbon polymer.

* * * * *